No. 844,124. PATENTED FEB. 12, 1907.
G. HALLIDAY.
FEED REGULATOR.
APPLICATION FILED JUNE 14, 1906.
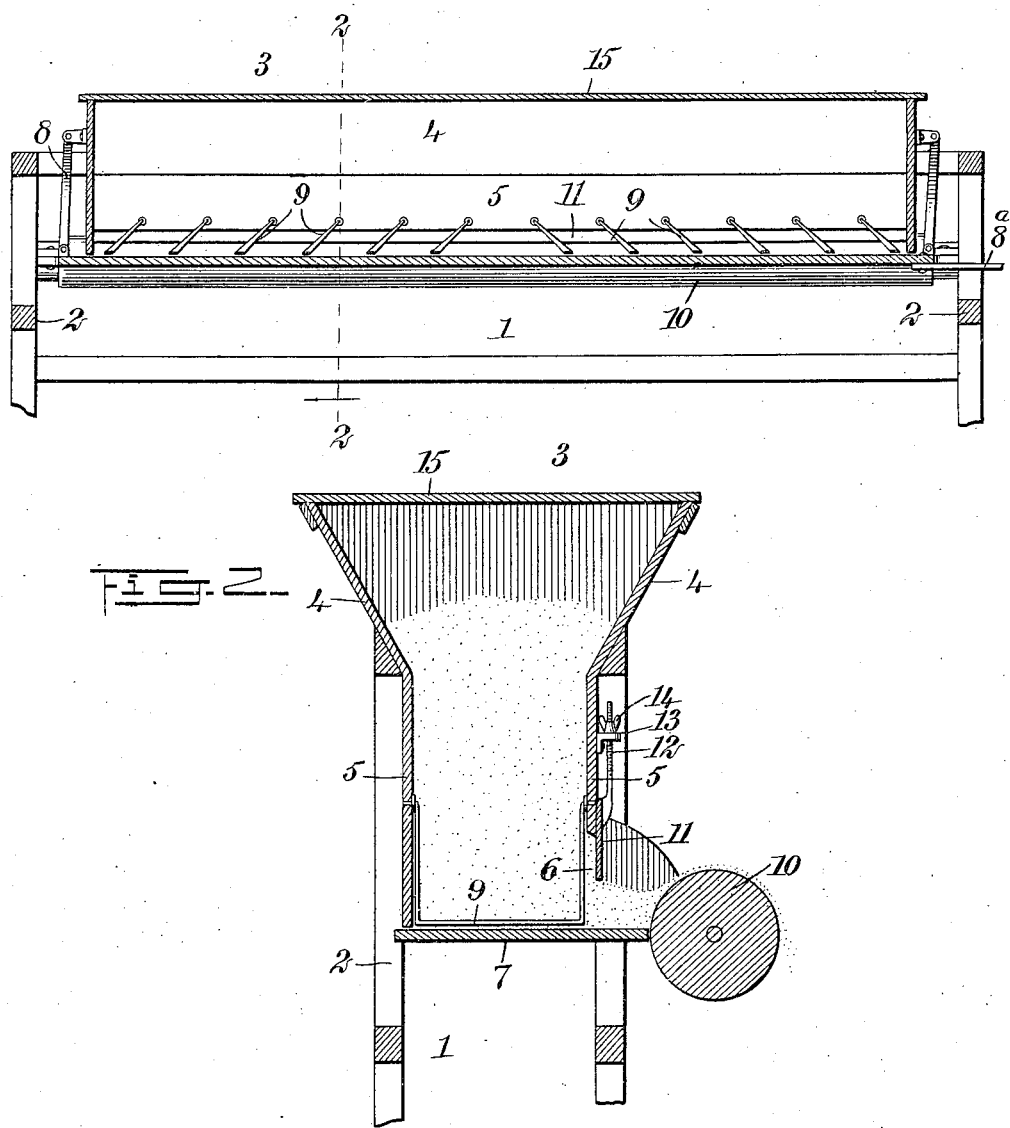
WITNESSES
INVENTOR
George Halliday
BY
ATTORNEYS

UNITED STATES PATENT OFFICE.

GEORGE HALLIDAY, OF SUPERIOR, WISCONSIN.

FEED-REGULATOR.

No. 844,124.      Specification of Letters Patent.      Patented Feb. 12, 1907.

Application filed June 14, 1906. Serial No. 321,642.

*To all whom it may concern:*

Be it known that I, GEORGE HALLIDAY, a citizen of the United States, and a resident of Superior, in the county of Douglas and State of Wisconsin, have invented a new and Improved Feed-Regulator, of which the following is a full, clear, and exact description.

This invention is an improved feed-regulator for the feeding of grain and other materials in a broad, thin, and continuous stream.

The invention contemplates a device of this character which shall be of simple construction and an effective means for positively distributing grain uniformly and at any desired rate.

Reference is to be had to the accompanying drawings, forming a part of this specification, in which similar characters of reference indicate corresponding parts in all the figures.

Figure 1 is a longitudinal central vertical sectional view through the machine looking in the direction of the feed-roller, and Fig. 2 is a transverse vertical section on the line 2 2 of Fig. 1.

Referring to the drawing-figures, the numeral 1 indicates a frame comprising end standards 2 2, suitably braced and supported and carrying at their upper ends a hopper 3. This hopper is made up of inclined side walls 4 4, connecting at their lower ends with walls 5 5, preferably arranged parallel to each other and joined to suitable end walls, the side wall at the front of the hopper being made shorter than the opposite wall to provide an opening 6 for the escape of the material. A bottom 7 is suspended, as by links 8, at each end of the hopper in order that it may have a reciprocating or oscillatory movement in order to uniformly distribute the material to the feed-roll. This bottom may be attached to any suitable means for oscillating it—as, for example, the rod 8ª, passing out at one side of the machine-frame.

Pivotally suspended between the parallel side walls 5 are U-shaped conveyers or distributers 9, arranged in two independent series, inclined in opposite directions from the center of the machine. These conveyers or distributers reach to the oscillatory bottom 7 and operate to scrape the material as the bottom moves in one direction and allow the material to pass under it as the bottom moves in the opposite direction, each series of said conveyers, in view of their reversely-inclined relation, alternating with each other in the scraping action in raking the material from the center toward each end, thereby at all times insuring even distribution of the same.

Journaled in the supporting-frame at one side of the opening 6 is a feed-roller 10, so positioned that its circumference will be in substantial contact with the projecting edge of the bottom 7 and the bottom will be in alinement with the roller-axis. This roller is to be driven by any suitable means, thereby lifting the material over its periphery and delivering it in a uniform continuous stream.

For regulating the flow of material the side wall 5, in which the opening 6 is provided, has slidable upon it a gate 11, extending the full length of the opening and having fixed to it at suitable points upwardly-projecting screw-rods 12. These screw-rods pass through apertured brackets 13, which are engaged by wing-nuts 14, threaded onto the rods and providing means for the vertical adjustment of the gate 11 in a well-known manner.

In practice it may be found desirable to employ a cover 15 for the hopper to inclose the material after it has been placed therein. Also numerous other details of construction may be varied without departing from the spirit of the invention, which is limited in scope by the annexed claims only.

Having thus described my invention, I claim as new and desire to secure by Letters Patent—

1. In a feeding-machine, a hopper comprising parallel side walls at its lower end, and having an opening through one of said side walls extending the length of the hopper, a gate carried by the side wall adjacent to the opening adapted to regulate the extent thereof, U-shaped conveyers pivotally mounted in the side walls arranged in two independent series reversely inclined from the center, an oscillatory bottom on the hopper for operating the conveyers, a roller journaled at one side of the gate and of the opening, having its axis substantially in the same horizontal plane as the bottom of the hopper, whereby as the roller revolves a continuous flow of material is delivered over its periphery.

2. In a feeding-machine, a hopper having an oscillatory bottom, said hopper having an opening in one side thereof adjacent to the bottom, and two independent series of conveyers or distributers inclined in opposite directions from the center of the hopper adapted to coöperate with the oscillatory bottom, for the purpose described.

3. In a feeding-machine, a hopper having an oscillatory bottom, distributers reversely inclined from the center of the hopper and coöperating with the bottom, the hopper having an opening at one side thereof, a gate adjustable over the opening, and a feed-roller journaled adjacent to the bottom at one side of the opening for delivering a continuous flow of material over its periphery as it is revolved.

4. In a feeding-machine, a hopper having an oscillatory bottom, and disconnected U-shaped members each pivotally suspended in the hopper crosswise of said bottom and coacting therewith for distributing the material in the hopper.

In testimony whereof I have signed my name to this specification in the presence of two subscribing witnesses.

GEORGE HALLIDAY.

Witnesses:
B. D. MERRELL,
HENRY PARKER.